United States Patent [19]

Stewart

[11] Patent Number: 4,557,029
[45] Date of Patent: Dec. 10, 1985

[54] CORE CAPPING APPARATUS

[76] Inventor: Richard M. Stewart, 944 Cascade Dr., Longview, Wash. 98632

[21] Appl. No.: 473,281

[22] Filed: Mar. 15, 1983

[51] Int. Cl.$^4$ .............................................. B23P 19/04
[52] U.S. Cl. ...................................... 29/253; 29/283.5
[58] Field of Search ............................... 29/253, 283.5; 269/48.1, 48.2, 48.3, 48.4; 279/2 R

[56] References Cited

U.S. PATENT DOCUMENTS

| 1,867,266 | 7/1932 | Johnson et al. | 279/2 |
| 2,429,053 | 10/1947 | Forbes, Jr. | 269/48.1 X |
| 3,758,098 | 9/1973 | Vrilakas | 269/55 |
| 4,334,703 | 6/1982 | Arthur et al. | 29/283.5 X |

FOREIGN PATENT DOCUMENTS 671984   7/1979   U.S.S.R. .............................. 269/48.1

Primary Examiner—James G. Smith
Assistant Examiner—Steven P. Schad
Attorney, Agent, or Firm—Chernoff, Vilhauer, McClung, Birdwell & Stenzel

[57] ABSTRACT

A capping head for a core-capping apparatus adapted to fix conforming sleeves within tubular fiber cores is constructed from a one-piece cylindrical shell having a bore therethrough to accommodate axial sliding movement of a partially conical, power actuated, tapered ram. Independent, individual punches and crimping heads are extensibly and retractably seated within recesses formed in the periphery of the shell and operatively communicate with the tapered ram through respective ball bearings located in guide passages which extend radially outward from the bore of the shell so that linear axial movement of the tapered ram within the shell causes corresponding linear, radially outward movement of the ball bearings and their respective punches and crimping heads, extending the punches and crimping heads outside of the periphery of the shell. The punches and crimping heads have respective retraction devices to cause them to retract within the periphery of the shell when allowed to do so by the position of the tapered ram. The bore of the shell is substantially sealed from the outside of the shell so that the innermoving parts may operate in a lubricated environment.

10 Claims, 8 Drawing Figures

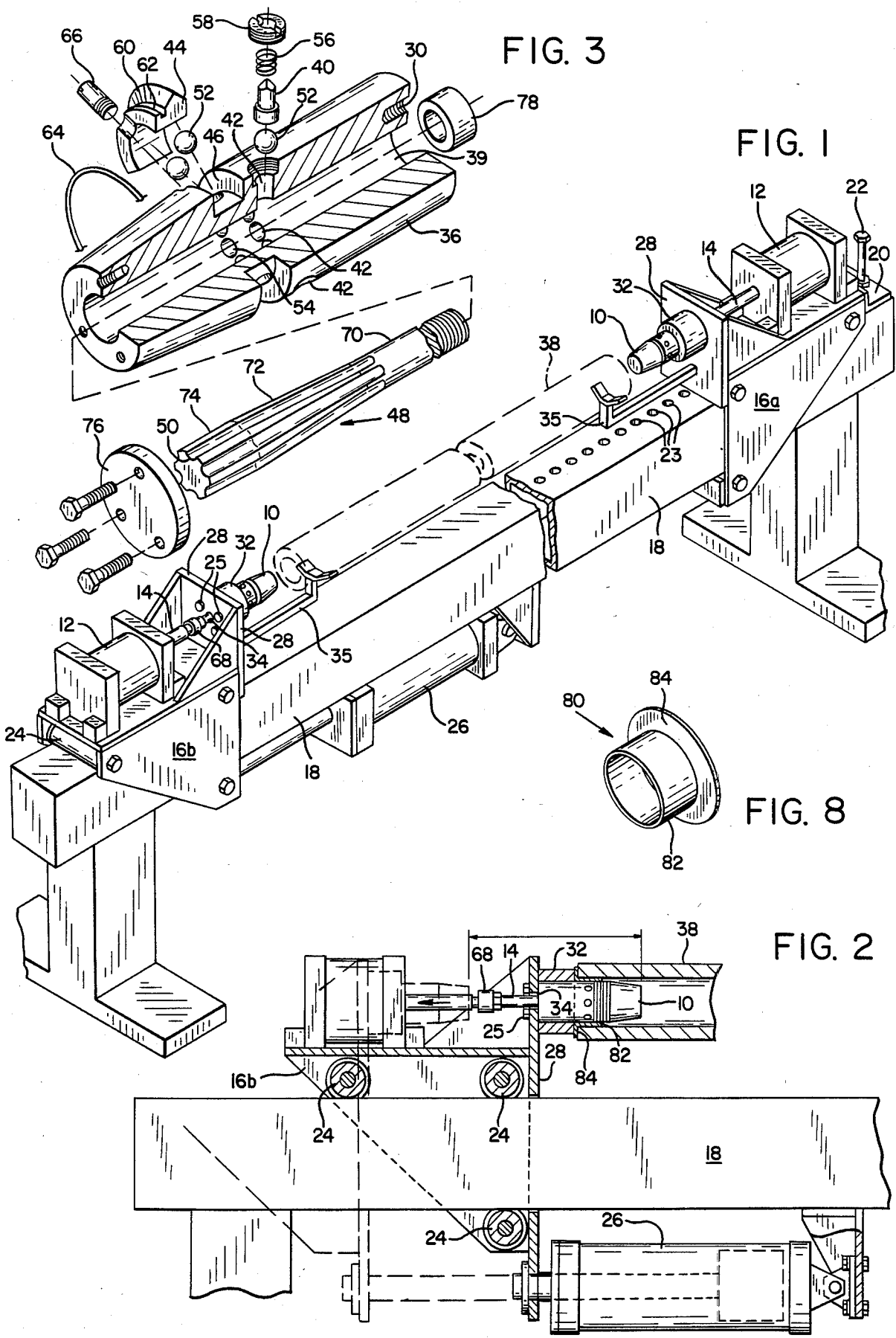

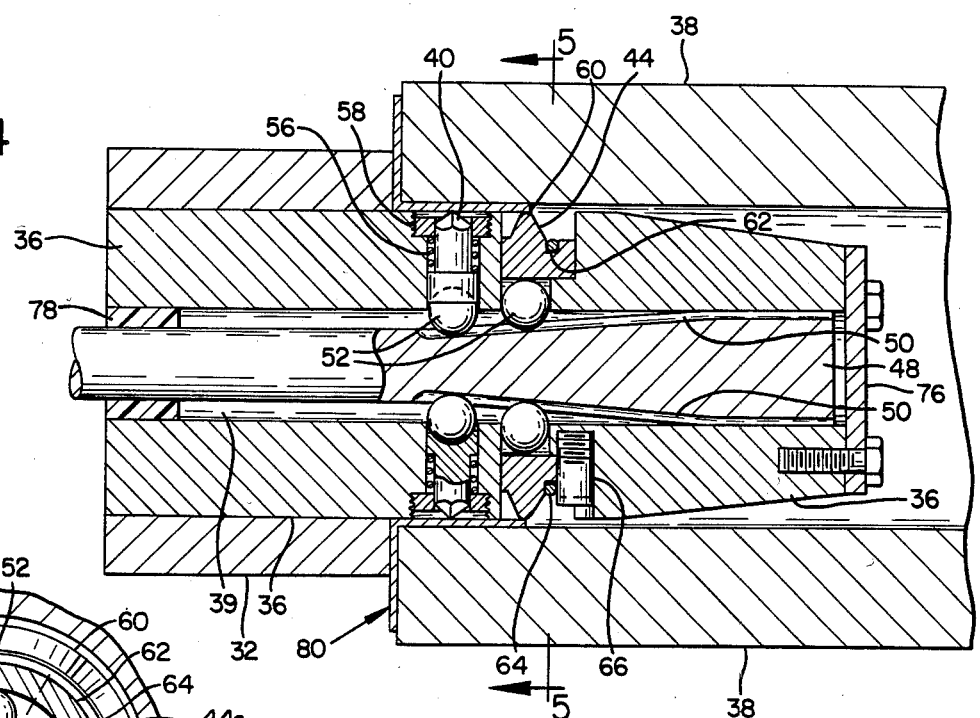
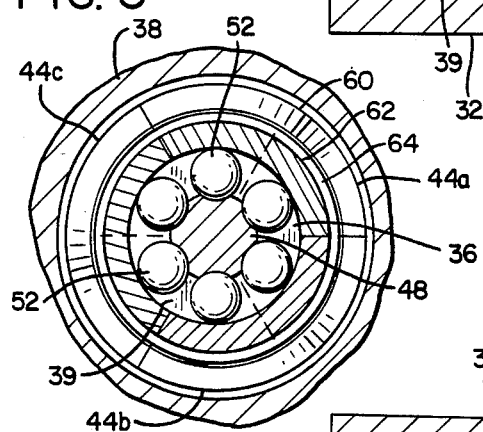
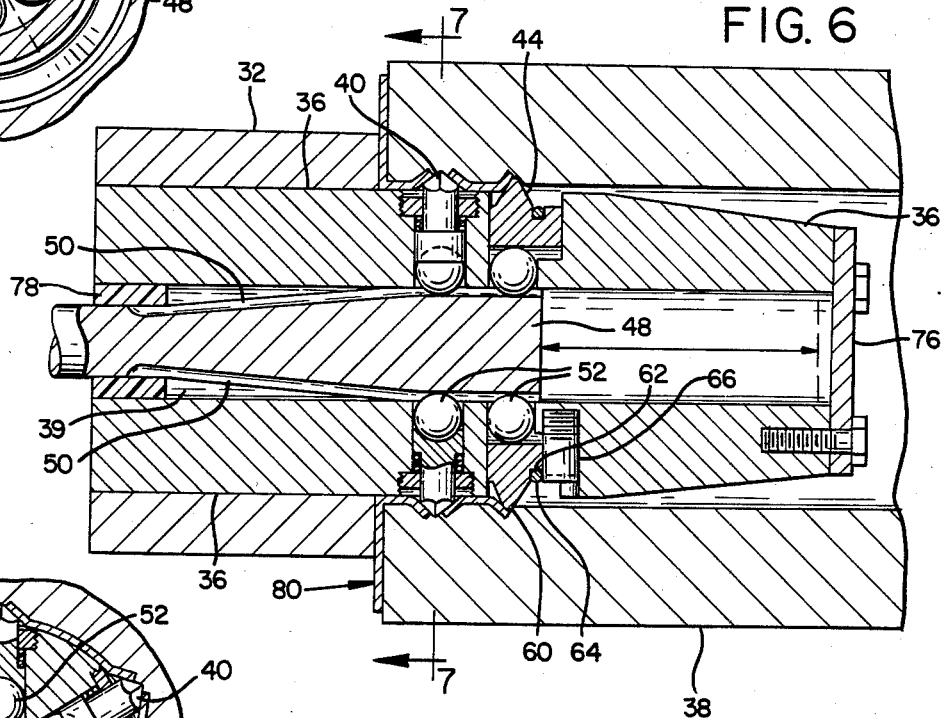
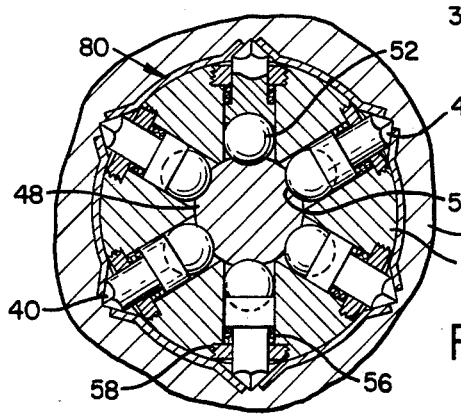

CORE CAPPING APPARATUS

BACKGROUND OF THE INVENTION

This invention relates to a core capping apparatus for fixing a conforming sleeve within a tubular member, and more particularly to a capping head for securely fixing an end cap within the bore of a tubular fiber core.

When bulk paper products such as blank newsprint sheet are manufactured, they are typically wound onto elongate tubular fiber cores forming large paper rolls for storage and transport. The end user of these bulk paper products customarily mounts these paper rolls upon machines having rotating chucks which grip the ends of the roll and spin the roll to dispense the paper therefrom. In some applications, such as newspaper printing, the paper is stripped from the spinning roll by high-speed printing presses which impart to the spinning paper roll considerable rotary inertia. When the high-speed printer is stopped, the rapidly spinning roll must be simultaneously braked to prevent over-spin of the roll and resultant unwinding of unused paper.

The fiber cores used for these rolls which do not have metal caps on their ends usually have serrated or slotted ends, and the chucks for rotatably mounting these types of cores have mating keys or serrations to enable them to positively engage the cores. Since the relatively soft fiber cores are forcefully interfaced with hard metal chucks, and considerable forces are transmitted through this interface, applying braking force to the roll through the chucks often damages the fiber cores, preventing re-use of the cores. Misalignment of the key and slot or the serrations during mounting of the cores can also damage the cores. For these reasons some fiber cores are being provided with metal caps which are fixed within the ends of the core, such caps usually comprising an internal conforming sleeve and an exterior annular flange, the flange lying flush on the flat end planes of the typically elongate cylindrical core. These capped cores mount on machines having expandable chucks which are inserted into the conforming metal sleeve portion of the caps, which in turn have been previously fixed within the extreme ends of the cores. The chucks expand to securely grip the sleeve portions of the caps and acceleration or braking force is applied to the core through the interface of the metal caps and chucks. This method of mounting the fiber cores prevents damage to the cores and enables them to be re-used many times. However, because of the considerable force applied to these caps in braking the spinning rolls of paper, it is essential that the caps be securely fixed within the ends of the core. For example, Japanese printers require that the cap be fixed within the core by at least six punched protrusions.

Applicant is aware of a prior art core capping apparatus manufactured by Berlin Foundry of New Hampshire comprising a floating-type capping head having four rampactuated pivoting head segments, each head segment having an associated crimper and punch and a spring loaded shield to cover the punch. An associated, axially sliding ramp forces each head segment to swing radially outward in an arcuate path, the crimper on the spring-loaded shield contacting the inner sleeve of the cap and forcing the shield to retract so that the punch extends through a hole in the shield and the punch and crimper deflect portions of the conforming sleeve to deformably engage the tubular core.

This type of core capping apparatus has several major problems and limitations: each crimper and punch is mounted on a separate head segment, thereby effectively limiting the number of punches by the growing complexity entailed in increasing the number of head segments; the crimper and punch engage the sleeve portion of the cap in an arcuate path, resulting in side-loading stresses on the punch, crimper and head segment; each head segment pivots around a single pin which tends to break frequently due to the considerable applied forces; the punches and the shield retaining screw also tend to break frequently due to the applied forces; the head segments can become misaligned from their respective actuating ramps; and finally, because there are many moving parts having metal-to-metal contact, and because these parts cannot be adequately lubricated due to the open floating nature of the head, the apparatus exhibits excessive wear. In addition, the four punches provided by this type of head may not provide a sufficiently strong interface between the core and the cap to handle high speed braking.

SUMMARY OF THE INVENTION

The aforementioned problems associated with the previously described core capping apparatus are overcome by the present invention which provides a capping head having a solid shell with multiple, independently actuated punches and crimping heads associated therewith which move radially outward along a straight line path to contact the conforming sleeve and cause it to deformably engage the tubular core.

The capping head, which is also used to place the end cap within the end of the tubular fiber core, comprises a solid, one-piece shell having a bore therethrough with a ring of punches and a ring of crimping heads mounted in the periphery of the shell. The crimping heads and punches are independently actuated by a single tapered ram which slides axially within the bore of the shell, the crimping heads and punches being operatively associated with the ram by ball bearings which ride on the tapered ram and communicate with the punches and crimping heads through respective guide passages formed in the shell. Axial movement of the tapered ram causes virtually simultaneous radial outward movement of the punches and crimper heads along a straight line path, causing them to forcefully contact the sleeve and deform it to engage the fiber core. Negligible force is applied to the shell itself by this operation, and only a radial force, perpendicular to the axial movement of the ram, is applied to the punches and crimper heads. The bore of the shell is substantially sealed from the outside, allowing the moving parts to be lubricated, and the lubrication cooperates with the ball bearings to reduce friction and wear, requiring less powerful actuating means to axially move the ram and deform the cap.

Accordingly it is a principal objective of the present invention to provide an improved, core capping apparatus for fixing a conforming sleeve within a tubular member.

It is a further object of the present invention to provide such an apparatus having independently actuated punches and crimping heads.

It is a further object of the present invention to provide such an apparatus which has relatively low operating friction and is resistant to wear.

It is a further object of the present invention to provide such an apparatus where the punches and crimping heads radially extend from the capping head to engage the conforming sleeve in a straight line path.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 1 is a perspective view of an exemplary embodiment of a core capping apparatus embodying the present invention showing the core in dotted lines.

FIG. 2 is a partially sectional, fragmentary elevational view of the clamping head portion of the embodiment shown in FIG. 1.

FIG. 3 is an exploded, partially cut-away view of an exemplary capping head.

FIG. 4 is a sectional elevational view of the capping head positioned within the bore of a core with the crimping heads and punches in retracted position.

FIG. 5 is a sectional view of the capping head shown in FIG. 4, taken along line 5—5.

FIG. 6 is a view similar to FIG. 4 but showing the punches and crimping heads in extended position.

FIG. 7 is a sectional end view of the capping head shown in FIG. 6, taken along line 7—7.

FIG. 8 is a perspective view of an exemplary embodiment of the end cap.

DETAILED DESCRIPTION OF THE INVENTION

Referring to FIG. 1 of the drawings, an exemplary embodiment of the present invention includes two opposed, axially aligned capping heads 10, each operatively connected to an associated head cylinder 12 by a connecting rod 14. Each capping head and head cylinder assembly is supportably mounted on respective head mounts 16a and 16b which in turn are movably mounted around the elongate cross member 18 of a supporting structure, the cross member extending parallel to the common axis of the capping heads.

The clamping head mount 16b is movably mounted around the elongate cross member by three rollers 24 as shown in FIG. 2, two rollers journaled to the clamping head mount above the cross member, and one roller journaled to the clamping head mount below the cross member to restrain the clamping head mount to movement generally parallel to the cross member. A clamping cylinder 26 is fixed to the underside of the cross member and operatively connected to the lower portion of the clamping head mount for selectively reciprocatingly moving the clamping head mount a predetermined distance along the elongate member as shown in FIG. 2.

The adjustable head mount 16a is movably mounted around the cross member in similar fashion to the clamping head mount 16b, and has a horizontal flange 20 on the rear thereof having an aperture therethrough for receiving an elongate locking pin 22. The pin 22 extends through the flange of the adjustable head mount and is received in apertures 23 formed in the elongate cross member 18 as shown in FIG. 1 to lock the adjustable head mount 16a in fixed position with respect to the cross member.

Each capping head 10 is joined to its respective head mount 16a and 16b by threaded bolts 25 which extend through a head plate 28 on the front of each respective head mount and are received in threaded bores 30 at the rear of each capping head as shown in FIG. 3, the front of each capping head facing inward toward the other capping head. A cylindrical shoulder stop 32 rigidly fixed to each head plate also helps support each capping head by closely surrounding the rear portion of the capping head. Each head plate has an opening 34 therein to allow each respective connecting rod 14 to extend therethrough between the capping head and the head cylinder. Each head mount is also equipped with an elongate inwardly extending core support 35 for supporting the tubular fiber cores 38 as shown in FIG. 1.

As shown in FIGS. 3-7, each capping head 10 is constructed of a generally cylindrical one-piece exterior shell 36 having a bore 39 therethrough. Six punches 40 are each movably positioned within respective punch guide passages 42 which are formed in the periphery of shell and extend radially outward through the shell from the bore as can be seen in FIG. 7. Associated with each of the six punches is a respective ball bearing 52, which is positioned beneath the punch within the respective punch guide passage, and a respective coil punch spring 56 which is compressed between an annular collar around the base of the punch and a respective threaded retaining ring 58 which is screwed into the threaded outer extremity of the punch guide passage. As can be seen in FIGS. 4, 6, and 7, the base of each punch has a partially spherical indention formed therein to receive its respective ball bearing.

Each capping head also has three crimping heads 44 movably positioned within a circumferential seat 46 formed in the periphery of the generally cylindrical shell in front of the punches. As can be seen in FIG. 5, each of the three crimping heads has the general shape of a circular circumferential segment so that the three crimping heads positioned within the circumferential seat 46 combine to form a whole circular circumference of the same general outer dimension as the circumference of the cylindrical shell. As seen in cross section in FIGS. 4 and 6, each crimping head is formed with a prominent ridge 60 and a trough 62, the latter adapting each crimping head to receive and retain a portion of a common rubber O-ring 64. A ring of six crimper guide passages 54, two guide passages corresponding to each crimping head, extend radially outward through the shell from the bore to the circumferential seat 46. A ball bearing 52 is positioned within each crimper guide passage. Three cylindrical guide pins 66, one corresponding to each crimping head, are removably positioned in the forward wall of the circumferential seat, the forward wall of each seat and the adjacent forward portion of each crimping head having semi-cylindrical indentations formed therein to accommodate the pins which are held in position by their threaded inward extremities which engage mating threaded recesses formed in the shell as can be seen in FIGS. 3, 4, and 7.

A tapered ram 48 is slidably positioned within the bore of each capping head and operably connected to its respective connecting rod 14. Each ram has six longitudinal convex grooves 50 formed therein to serve as tracks for the ball bearings 52 which are movably positioned within each punch guide passage 42 and crimper guide passage 54 as can be seen in FIGS. 3, 4, and 6. The grooves are of appropriate width and cross section to conformingly mate with a circumferential segment of the ball bearings so as to create a large area of surface contact between the ram and the ball bearings. This large surface area interface reduces the friction and wear between the ram and the ball bearings as the ram slides axially within the bore of the capping head. The crimper guide passages 54 are radially aligned with the punch guide passages as shown in FIGS. 3–7 so that a ball bearing associated with a given punch rides in the same longitudinal groove of the tapered ram as does the corresponding ball bearing for the crimper.

The rearward extension of each tapered ram is connected to the head cylinder by its respective connecting rod by means of a threaded coupling not shown. The connecting rods may incorporate a self-aligning connector 68 as shown in FIGS. 1 and 2 to compensate for minor misalignment of the respective tapered ram with respect to the stroke of the respective head cylinder. Each tapered ram has a relatively narrow, uniformably cylindrical shaft portion 70 at the rear thereof, a tapered, grooved, conical portion 72 in the middle, and a relatively thick, grooved cylindrical portion 74 at the front as may be readily seen in FIG. 3.

A face plate 76 is mounted to the front of each capping head by three bolts to substantially seal the bore 39 of the capping head. A hollow cylindrical bushing 78, preferably nylon, seals the rear of the bore, fitting closely around the shaft portion 70 of the tapered ram to allow the ram to be moved axially within the bore.

In operation, the adjustable head mount 16a is locked into the appropriate position with respect to the cross member 18 according to the length of the tubular fiber core to be capped by aligning the hole in the flange 20 at the rear of the adjustable head mount with the appropriate aperture 23 in the cross member and inserting the locking pin 22 therethrough. The fiber core is supported at each end by the core supports 35 associated with each head mount. A one-piece cap 80 having a cylindrical sleeve portion 82 and an annular flange portion 84 extending from one end of the sleeve at right angles thereto, as shown in FIG. 8, is placed upon each of the opposed capping heads 10 with the sleeve portion of each cap facing inwardly toward the other cap.

The clamping cylinder 26 is then activated, causing the movable head mount 16b to forcefully move inwardly toward the locked adjustable head mount, driving both capping heads and the sleeve portion of the end caps into the ends of the fiber core so that the flange portion of the cap is positioned flush against the end of the core by the shoulder stop 32 as shown in FIG. 2.

The two head cylinders 12 are then activated in unison causing the respective tapered ram 48 within each capping head to axially move rearward within its respective shell 36 from the forward position shown in FIG. 4 to the rearward position shown in FIG. 6. As each tapered ram moves rearwardly, the ball bearings 52 respectively associated with the punches 40 and crimping heads 44 are caused to move radially outward within their respective guide passages from the bore 39 of the capping head by the rearward axial movement of the conical portion 72 of the ram. The outward radial movement of each ball bearing causes their associated punches and crimping heads to similarly move radially outward in a straight line path normal to the axial travel of the ram, until they forcefully contact the cap and deform the sleeve portion 82 of the cap so it engages the inner surface of the fiber core as shown in FIGS. 6 and 7. The amount of radial travel of the punches and crimping heads is governed by the slope of the conical portion of the tapered ram and the length of the stroke of the head cylinder. As can be seen in FIGS. 4 and 6, the punches will have greater radial movement away from the bore than the crimping heads because the ball bearings associated with the punches have a longer path of travel on the sloping or conical portion 72 of the ram.

Each shoulder stop 32 ensures that the cap is fully inserted into the ends of the core so that the crimper heads are aligned with the margin of the sleeve portion of the cap as shown in FIGS. 4 and 6. Since the three crimper heads 44a, 44b, and 44c are each shaped as a circular circumferential segment as shown in FIG. 5, together they generally correspond in shape to the circular inner circumference of the sleeve, and when extended as shown in FIG. 6, force the inner margin of the sleeve portion of the cap radially outward, penetrating the inner surface of the fiber core and fixing the cap within the core.

The axial movement of each tapered ram also causes the punches to move radially outwardly from the position shown in FIG. 4 to that shown in FIG. 6, deforming the sleeve portions of the cap in six places so that deformed portion of the sleeve protrudes into the fiber core to fix the cap to the core as shown in FIGS. 6 and 7. As explained previously, for high speed printing applications it is vital that there be a sufficient number of punches and that they cause sufficient adherence between the cap and the core to resist the rotary braking force applied to the cap. A moment's reflection will reveal that while the crimped margin of the sleeve portion of the cap is excellent for resisting forces applied to the cap parallel to the axis of the core, such a crimped margin would not be sufficient to resist large rotary forces applied to the cap.

Typically the head cylinders would be controlled to reciprocate completely through one cycle so that each head cylinder would cause each tapered ram to move rearwardly and then immediately return to the forward position shown in FIG. 4. The punch springs 56 which were compressed by the punches when the punches were in the extended position as shown in FIG. 6 are allowed to expand when the ram returns to its initial forward position, thereby retracting the punches within the shell as shown in FIG. 4. Similarly, the resilient O-ring which retains the crimping heads was stretched when the crimpers were in the extended position and is allowed to return to its normal size when the ram returns to the forward position, causing the crimper heads to retract into the position shown in FIG. 4.

Once the head cylinders have cycled, the cap is securely fixed to the fiber core and the clamping cylinder is activated to extend and move the clamping head mount 16b away from the adjustable head mount 16a withdrawing its respective capping head from the fiber core and allowing the fiber core to be physically removed from the capping apparatus. The process may now be repeated with a new fiber core and two new caps. Of course, in normal operation, the initial retraction of the clamping cylinder, cycling of both head cylinders, and extension of the clamping cylinder are performed automatically in rapid succession.

It is important to note that each crimper head and punch is independent in that it is not connected to any fixed structure or to any other punches or crimping heads. Both punch and crimper head are movably confined by their respective ball bearings below and their respective resilient retaining means, spring or O-ring, above. Each punch is confined to straight line radial movement perpendicular to the bore of the shell by its respective punch guide passage. Each crimper head is confined to the same straight-line radial movement perpendicular to the bore of the shell by the adjacent crimper heads on either side, the wall of the circumferential seat 46 to the rear and its respective guide pin 66 to the front.

As previously noted, the bore of each capping head is sealed at the front by the face plate 76 and at the rear by the bushing 78. The punch and crimper guide passages are formed to closely fit the punches and ball bearings, thereby substantially sealing the bore of the capping head from the outside thereof and allowing the entire bore to be filled with grease or other suitable lubricant. The combination of the lubricant and the use of ball bearings results in a device which has minimal frictional losses, allowing the apparatus to be activated by typically available "factory" compressed air systems and does not require a separate power or actuation source. Furthermore, there is little wear of the capping head due to the lubrication and the closely fitting guide passages and the ball bearings, resulting in an apparatus with a long useful life which does not have to be constantly readjusted as the moving parts wear.

The apparatus described herein and shown in FIGS. 1–8 illustrates an exemplary embodiment, and such an apparatus having an other than cylindrical shape, or different numbers or shapes of crimper and/or punches is contemplated by this inventor.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A capping head for fixing a conforming sleeve within a tubular member comprising:
   (a) a substantially solid shell having a longitudinal bore and radial passages, said shell being capable of substantially fitting within said conforming sleeve;
   (b) forming means arranged peripherally of said shell and radially movable with respect to said shell between extended and retracted positions for deflecting a portion of said sleeve to deformably engage said tubular member;
   (c) tapered ram means axially slidable within said bore for moving said forming means between said extended and retracted positions;
   (d) ball bearings operatively interposed in said passages between said ram means and said forming means, said ball bearings being unattached to said ram means and said forming means;
   (e) retaining means associated with said forming means for maintaining said forming means in association with said shell and said ball bearings within said passages of said shell, said retaining means including resilient means for urging said forming means to said retracted position; and
   (f) said forming means including longitudinally spaced apart punch means and independent crimping means for deflecting a significant circumferential segment of said sleeve to deformably engage said tubular member.

2. The apparatus of claim 1 wherein said forming means and said retaining means are seated within the periphery of said shell when said forming means are in said retracted position.

3. The apparatus of claim 1 wherein said retaining means are operatively removable from the exterior of said shell for removal of said forming means and said ball bearings.

4. The apparatus of claim 1 wherein said ball bearings constitute means for substantially sealing said bore of said shell from the exterior thereof.

5. The apparatus of claim 1 wherein said punch includes recessed means for conformingly mating with said respective ball bearing for creating a surface interface therebetween.

6. The apparatus of claim 1 wherein said retaining means associated with said punch includes a retaining ring defining opening means therein for permitting a portion of said punch to extend through said opening of said retaining ring to said extended position.

7. The apparatus of claim 1, said shell including circumferential recessed means for receiving said crimping means in said retracted position.

8. The apparatus of claim 7, said recessed means including guide means for guiding said crimping means between said extended and retracted positions.

9. The apparatus of claim 1, said crimping means including at least two independent arcuate circumferential segments together approximating the circumference of said shell.

10. The apparatus of claim 1, said shell including means for inserting said conforming sleeve within said tubular member and for positioning said conforming sleeve with respect to said shell while said shell and said conforming sleeve are within said tubular member.

* * * * *